United States Patent Office 3,262,675
Patented July 26, 1966

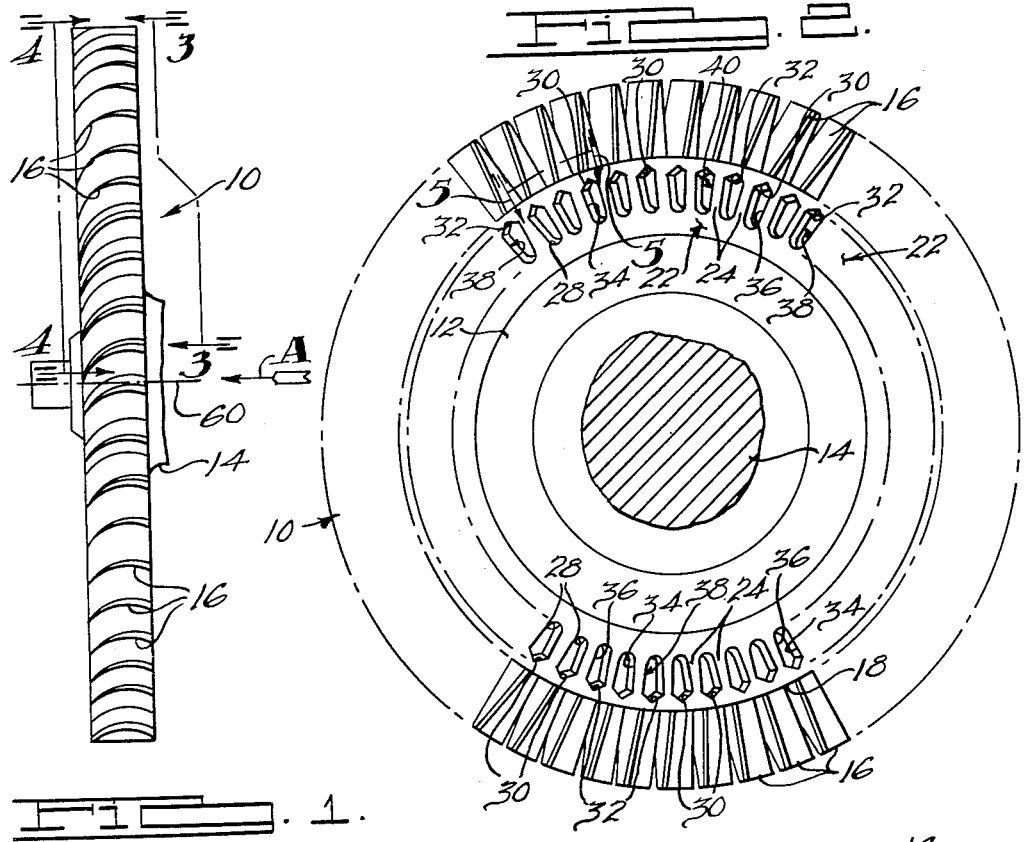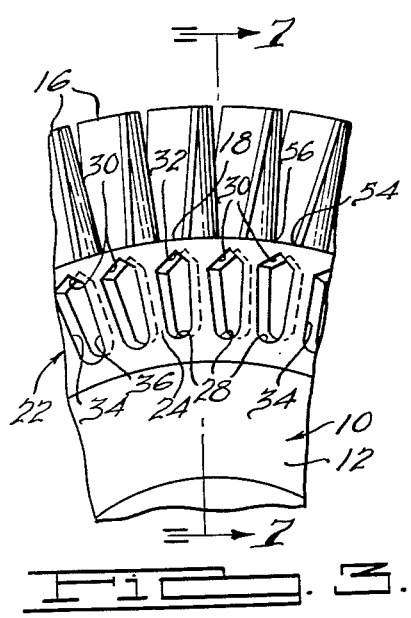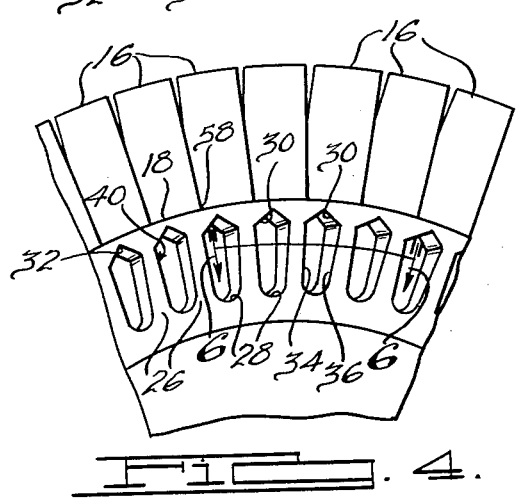

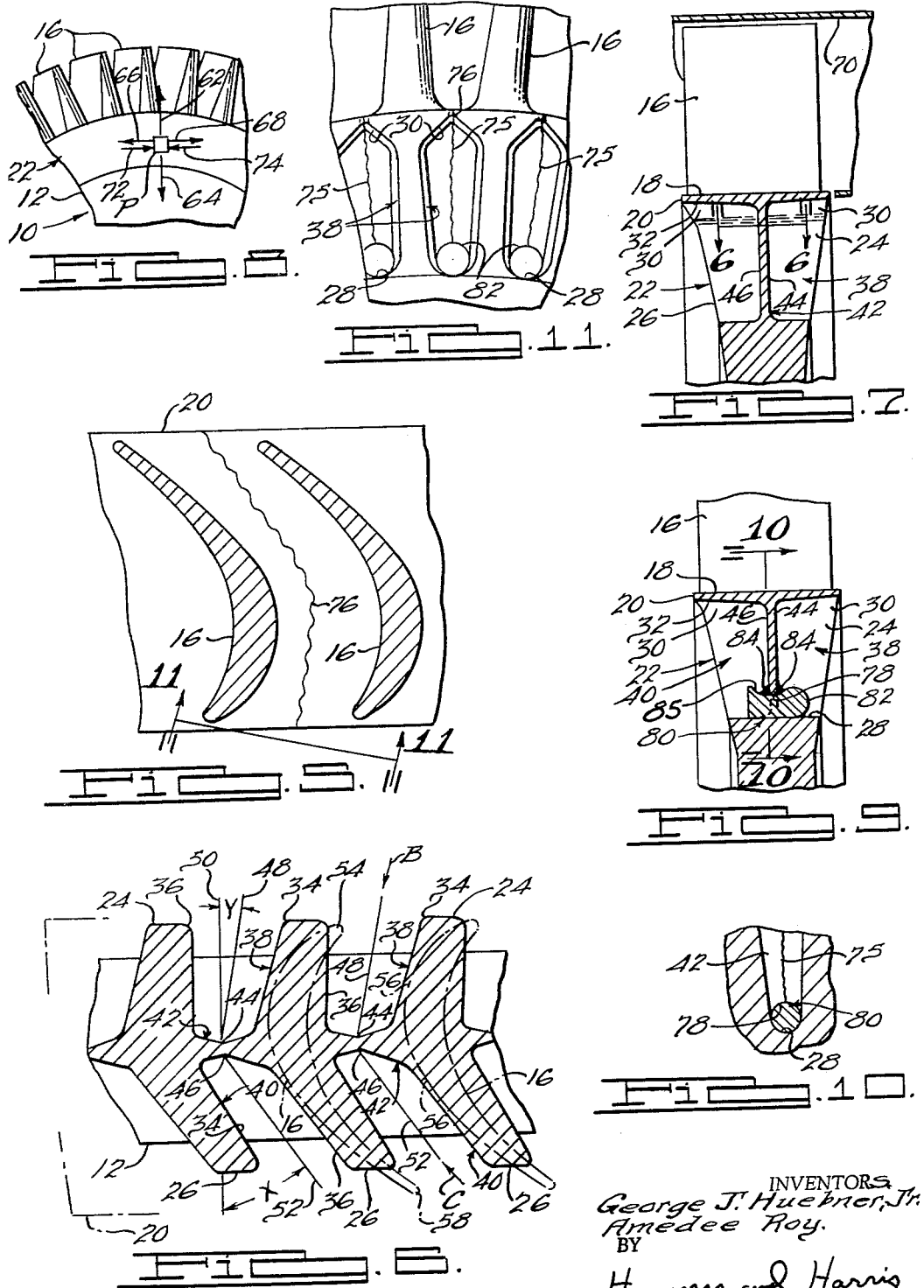

3,262,675
TURBINE WHEEL
George J. Huebner, Jr., Bloomfield Hills, and Amedee Roy, Birmingham, Mich., assignors to Chrysler Corporation, Highland Park, Mich., a corporation of Delaware
Filed May 27, 1964, Ser. No. 370,577
9 Claims. (Cl. 253—77)

This invention relates generally to a gas turbine engine and more particularly to a turbine wheel for use therein.

In the past, turbine wheels have been formed so as to be comprised generally of a disc-like body portion having a rim formed thereon or secured thereto and a plurality of radially directed circumferentially spaced blades formed on or secured to the rim portion. In some instances the disc body has also been provided with a hub portion for securing the wheel to a cooperating shaft.

In every application of a turbine wheel one of the prime considerations is the inertial characteristics of the wheel. That is, in order to assure quick response by the wheel to the motive fluid passing therethrough, precautions are normally taken to reduce the polar moment of inertia of the wheel. This usually is achieved by reducing the mass of the wheel in somewhat a proportion to the radial distance of that mass away from the axis of rotation of the wheel.

In gas turbine engine applications, the turbine wheels experience various stresses during normal engine operating. These stresses can be broadly classified into three general categories the first of which includes mechanical stresses due to the centrifugal force resulting from high speed rotation of the turbine wheel. The second category includes those stresses arising from the vibratory energy included into the turbine wheel, while the third category of stresses could be referred to generally as thermo-stresses arising from exposure of at least the turbine blades to relatively high heats as that occasioned by the extremely hot motive gases passing therethrough.

Because of these three categories of stresses the mass of the rims and bodies of turbine wheels of the prior art design could not be effectively reduced to the degree desired in order to obtain a highly responsive turbine wheel. That is, heretofore it has been considered necessary to have the rim and disc body adjacent the rim of a cross-sectional thickness sufficient to prevent cracking of the turbine wheel due to the stresses developed during operation. The cross-sectional thickness in such instances has in turn caused the general peripheral mass of the wheel to increase to the degree resulting in a considerable increase in inertia and consequent loss of wheel acceleration response.

Accordingly, an object of this invention is to provide a novel and improved turbine wheel which has a relatively low polar moment of inertia.

Another object of this invention is to provide a turbine wheel of a configuration which effectively eliminates the deleterious effects of thermal stresses normally arising from exposure to relatively hot motive gasses.

Still another object of this invention is to provide means in a turbine wheel for effectively reducing or minimizing the occurrence of damaging induced vibratory stresses.

Other objects and advantages of the invention will become apparent when reference is made to the following description and accompanying drawings wherein:

FIGURE 1 is a side elevational view of a turbine wheel constructed in accordance with the teachings of this invention;

FIGURE 2 is an end view of the turbine wheel taken generally in the direction of arrow A of FIGURE 1;

FIGURE 3 is an enlarged fragmentary elevational view taken substantially on line 3—3 of FIGURE 1;

FIGURE 4 is an enlarged fragmentary elevational view taken substantially on line 4—4 of FIGURE 1 and looking in the direction of the arrows;

FIGURE 5 is a fragmentary elevational view taken generally on line 5—5 of FIGURE 2;

FIGURE 6 is an enlarged fragmentary cross-sectional view taken generally on the plane of line 6—6 of FIGURE 4, also illustrated in FIGURE 7, and looking in the direction of the arrows;

FIGURE 7 is an enlarged fragmentary cross-sectional view taken generally axially of the turbine wheel as, for example, on the plane of line 7—7 of FIGURE 3;

FIGURE 8 is a fragmentary view, similar to FIGURE 3, diagrammatically illustrating the forces incurred by an infinitesimal particle of the turbine wheel during periods of operation;

FIGURE 9 is an enlarged fragmentary cross-sectional view similar to FIGURE 7 further illustrating details of the invention;

FIGURE 10 is a fragmentary cross-sectional view taken substantially on line 10—10 of FIGURE 9 and looking in the direction of the arrows; and FIGURE 11 is an enlarged fragmentary view taken substantially on the plane of line 11—11 of FIGURE 5.

Certain details are omitted from one or more figures for purposes of clarity.

Referring now in greater detail to the drawings, a turbine wheel 10 is illustrated as being comprised generally of a disc-like body 12 provided with a centrally disposed hub portion 14 for mounting the body 12 to a suitable shaft, and a plurality of radially directed circumferentially spaced blades 16 against which a cooperating motive fluid is directed in order to impart rotative motion to the turbine wheel 10 and its associated shaft. Blades 16 are formed as to extend generally radially outwardly from the outer surface 18 of rim 20 which comprises a portion of an annular support or pedestal arrangement 22.

The annular support 22 is comprised of a plurality of generally radially directed circumferentially spaced front and rear struts or ribs 24 and 26, respectively. The terms "front" and "rear" are used to denote the position of the ribs axially of the wheel 10. That is, the front ribs 24 would be on the upstream side of the wheel while the rear ribs 26 would be on the downstream side of the wheel.

Succeeding ribs or struts are joined to each other at their respective radially inner-most ends by a fillet-like arcuate portion 28 as shown generally in FIGURES 2, 3 and 4. The radially outer-most ends of each of the ribs is provided with a tapered portion 30 which tapers outwardly from the rib and joins a similarly tapered portion of the adjacent rib to form an apex or juncture 32 which is generally conterminous with the lower portion of the rim 20.

Surfaces 34 and 36 of adjacent front ribs 24 along with tapered portions 30 and arcuate portions 28 collectively define front recesses 38 which extend inwardly and generally axially of the wheel 10. Similarly, surfaces 34 and 36 of adjacent rear ribs 26 along with associated tapered portions 30 and arcuate portions 28 collectively define rear recesses 40 which also extend inwardly and generally axially of the wheel. As illustrated in FIGURES 6 and 7, the front and rear recesses extend inwardly of the wheel 10 towards each other and are separated by a common thin wall 42.

It should be noted that both recesses 38 and 40 extend inwardly into the wheel 10 at a slight angle with respect to a plane containing the axis of the wheel. For example, a plane passing through the middle of recess 38 will have a trace 48 at an angle Y with respect to trace 50 of the plane passing through the axis of wheel 10. Similarly, a plane passing through the middle of recess 40 will have a trace 52 which is at an angle X with respect to trace 50. In the embodiment disclosed, angle X is greater than angle Y; however, as will become apparent the precise relationship of angles X and Y is not controlling in the practice of the invention.

Both sides of each of the walls 42 are preferably tapered inwardly towards each other so as to form indentations 44 and 46 generally along the wall 42 and radially of the wheel 10. Indentations 44 and 46 are provided in order to define an area of reduced cross-sectional thickness in walls 42 thereby creating an area for stress concentration. In certain of particularly successful embodiments of the invention the thickness of the reduced portion of the walls 42 was in the order of 0.010 to 0.020 inch.

In FIGURE 6 the root profile of a couple of blades 16 is illustrated in phantom line in order to better illustrate the position of the respective blades to the ribs 24 and 26 immediately radially inwardly of the rim 20.

Referring to FIGURES 3, 4 and 6, if recesses 38 are viewed in the direction of arrow B of FIGURE 6, it can be seen that the outer-most end of the respective apexes 32 are substantially midway of the projected distance between root 54 of the front of one of the blades 16 and root 56 of a median portion of the next adjacent blade 16. Similarly, if recesses 40 are viewed in the direction of arrow C of FIGURE 6, it can be seen that the outer-most end of the respective apexes 32 of recesses 40 are substantially midway of the projected distance between root 58 of the rear of one of the blades 16 and the root 56 of the median portion of the next adjacent blade 16.

In FIGURE 6, the forward and rearward ends of the respective blades are shown as projecting some distance beyond ribs 24 and 26. Such ends are, however, fully supported by the respective ribs because, as illustrated, for example, in FIGURES 3, 4, and 5, the ribs are provided with not only tapered portions 30 but also taper outwardly from the axially medial portion of the wheel so as to have the largest width axially of the wheel immediately below the rim 20. FIGURE 6 is a cross-sectional view obtained on lines 6—6 of either FIGURES 4 or 7 somewhat radially inwardly of where tapered portions 30 join surfaces 34 and 36.

Referring to FIGURES 1 and 8, let it be assumed that the wheel 10 is caused to rotate about its axis 60 and that the square, identified as P, is an infinitesimal particle of the wheel. Due to the centrifugal and centripetal forces developed during rotation of wheel 10, particle P experiences tension as illustrated generally by the force vectors 62 and 64. That is, particle P is urged radially outwardly of wheel 10 but at the same time restrained to some degree by the adjoining particles. The greater the angular velocity, the greater, of course, are forces 62 and 64.

With the high rotational speeds experienced by turbine wheels actual radial expansion of the wheel is incurred. Accordingly, it can be appreciated that such radial expansion requires substantially every infinitesimal particle of the wheel to experience slight radially outward movement. Consequently, the infinitesimal particles circumferentially adjoining particle P cause particle P to be placed in a state of generally circumferential or tangential tension as indicated by force vectors 66 and 68.

The forces described above are those resulting from merely rotation of the turbine wheel. However, additional forces are created whenever the wheel 10 is exposed to high heat as, for example, the hot motive gases employed in a gas turbine engine.

Referring to FIGURES 7 and 8, let it be assumed that hot motive gases are being directed through an annular conduit 70 and against blades 16 so as to impart rotative motion to wheel 10. Due to rotation, particle P will, of course, experience forces 62, 64, 66 and 68 as previously described. However, because of the heat transfer incurred as between the hot motive gases, the blades 16 and pedestal structure 22, the forces developed on particle P are somewhat altered.

For example, referring to FIGURES 7 and 2, it should be apparent that a temperature gradient will exist as between generally blades 16 and the hub 14 of wheel 10 due to the relatively cold hub 14 and the hot motive gases impinging against blades 16. Consequently, the radially outer-most portions such as rim 20 and support structure 22 expand to a greater extent than the adjoining radially inner portions of the wheel 10.

Therefore, since portion 12 of wheel 10 prevents rim 20 and support structure 22 from expanding to the degree normally required by the temperature of the rim and support, rim 20 and wall 42 of support 22 are placed in a state of circumferential or tangential compression. If particle P of FIGURE 8 is considered to be a particle of rim 20, for example, it becomes apparent that because of the attempt to expand by the circumferentially adjoining particles and the restraining effect thereon by the relatively cooler portion of the wheel, that particle P is now placed in a condition of circumferential or tangential compression as indicated generally by force vectors 72 and 74 which have replaced vectors 66 and 68. As the temperature gradient increases the compression experienced in the rim 20 becomes sufficient to result in plastic deformation of the rim material. The deformation accommodates, to some degree, the expansion required by the relatively hot radially outer portions of the wheel.

However, upon subsequent cooling of the wheel 10, as occasioned during, for example, engine shut-down, or reduced temperature and engine output, a reversal of forces occurs. That is, those sections of the radially outer portion of the wheel 10, such as rim 20, attempt to contract and return to their normal state free of induced stresses. However, such contraction is inhibited because these very same portions have, as discussed above, previously undergone plastic deformation. Consequently, the particles, such as P, which were previously in a state of tangential compression are once more placed in a state of circumferential or tangential tension as illustrated generally by force vectors 66 and 68. These forces in turn cause cracks to occur generally radially of wheel 10 at points of greatest stress concentration.

The problem of thermally induced stresses as described above is well known to the prior art. It has been a commonly accepted belief, by those skilled in the art, that such thermally induced wheel cracks are incompatible to an otherwise properly functioning turbine wheel and that a turbine wheel which developed such cracks could not be further safely employed within an engine. Consequently, the prior art has heretofore proposed various arrangements for strengthening the turbine wheel rim and/or thermally isolating the wheel blades 16 from the supporting rim structure. Such proposed solutions have not, however, proven to be entirely satisfactory.

In the embodiment of the invention disclosed, not only does rim 20 experience the various forces described but so also does the wall or web 42 separating recesses 38 and 40. This invention, contrary to the prior art and contrary to the commonly accepted belief by those skilled in the art, provides an arrangement specifically intended to give rise to the occurrence of such thermally induced cracks.

As previously stated, the cross-sectional thickness from apexes 32 to surface 18 of rim 20 are minimal as are the cross-sectional thicknesses of webs 42 between indentations 44 and 46. Accordingly, as compressive forces are created, due to temperature gradients, plastic deformation, if it is to occur, will exhibit itself to the greatest extent in such sections of reduced cross-sectional area. Subsequently, as wheel 10 cools, during periods of for example engine shutdown, reverse tangential tension forces occur on the infinitesimal particles comprising such sections of reduced cross-sectional area. Consequently, contrary to the prior art, cracks are encouraged to occur through such sections of localized stress. As such cracks occur, they will appear through webs or walls 42 in the vicinity of indentations 44 and 46 so as to assume a generally radial position with respect to the axis 60 of the wheel 10. Further, cracks will also occur generally axially of wheel 10 through rim 20 so as to be in a pattern generally defined by plane traces 48 and 52 of FIGURE 6. An example of such a generally axially directed crack is illustrated at 76 of FIGURE 5.

The radial cracks 75 will, of course, occur in webs 42 at the areas of greatest stress concentration which would, in the embodiment of the invention disclosed, be determined by indentations 44 and 46. Such cracks 75 progress radially inwardly towards the center of the wheel 10 to the point where provision is made to limit the further progress of such cracks.

The invention as herein disclosed contemplates the provision of a generally circular aperture 78 formed through each of the webs 42 so as to have its peripheral surface at least in close proximity to the arcuate surface of fillet 28. Accordingly, the radially inward extension of cracks 75 formed through webs 42 is prevented beyond the respective apertures 78. That is, referring to FIGURE 10, as crack 75 progresses to and breaks through aperture 78, further radial inward progress is precluded because of the substantially complete dissipation of stresses over the circular periphery of aperture 78.

By enabling such radial 75 and axial 76 cracks to occur in pre-designated areas, the possibility of having cracks occur in or relatively close to the root or base of the respective turbine blades is averted. Additionally, continued recycling (heating and cooling) of the turbine wheel will not give rise to either uncontrolled extensions of the cracks already formed or in any way allow the occurrence of pernicious cracks.

As should be apparent, a turbine wheel operating within the environment of a gas turbine engine experiences a pressure differential as between its upstream and downstream sides. Therefore, in order to eliminate leak passages, it has been found extremely beneficial to insert a rivet 80 through each of the apertures 78 in a manner causing the rivet head 82 to be disposed generally on one side of web 42 while an upset end 85 is located on the other side of wall 42. The provision of such a rivet 80, of course, precludes apertures 78 from becoming leak passages for the motive fluid in the gas turbine engine.

For various reasons, as for example the dimensional tolerances required in producing apertures 78 and rivets 80, it has been found highly beneficial to provide a filler like material 84 generally about each of the rivets 80 and preferably on each side of web 42 so as to fill any possible void existing between the respective cooperating rivets 80 and apertures 78. The selection of the particular filler material 84 to be employed must of course be based on a consideration of the temperatures to which it will be exposed during normal operation.

Although only a preferred embodiment of the invention has been disclosed and described, it is apparent that other embodiments of and modifications of the invention are possible within the scope of the appended claims.

We claim:

1. In a turbine wheel having a disc-like body and a plurality of circumferentially spaced radially directed turbine blades, a circumferentially continuous annular pedestal portion carried by said body and in turn peripherally carrying said turbine blades, said annular pedestal portion comprising a plurality of radially directed ribs extending generally axially of said wheel, an annular axially extending rim, said ribs being formed so as to be joined to said disc body at their respective radially innermost ends and to be joined to said annular axially extending rim at their respective radially outermost ends, a radially directed wall formed between and joining successive spaced ribs, each of said walls having formed therein a generally radially directed structurally weakened area so as to define a generally radially directed area for localizing thermally induced stress thereby enhancing the opportunity for radially directed controlled thermal stress dissipating cracks to be formed through said areas of localized stress whenever said turbine wheel is first caused to experience a radial temperature gradient and subsequently permitted to experience a reduction in said temperature gradient, and means generally between the radially innermost ends of said ribs for limiting the radially inward propagation of said cracks, said last mentioned means comprising a generally circular aperture formed through each of said walls so as to intersect said structurally weakened area, and means inserted through each of said circular apertures and mechanically retained therein for forming a substantial barrier to the free passage of fluids through said circular apertures.

2. A turbine wheel comprising a disc-like body, an annular pedestal portion radiating therefrom and circumferentially thereabout, a plurality of circumferentially spaced turbine wheel blades supported on said pedestal portion and radiating outwardly therefrom, said pedestal portion comprising a plurality of circumferentially spaced radially extending generally axially directed ribs joined at their respective radially innermost ends to said body, an arcuate connecting portion joining the radially innermost ends of pairs of adjacent ribs so as to provide a surface for stress dissipation between such adjacent ribs, an annular axially directed rim joining the radially outermost ends of said ribs, a tapered connecting portion formed on each side of each of said ribs near the radially outermost end thereof and joining the radially innermost surface of said rim, a web generally transverse of said wheel joining adjacent ribs medially thereof, a plurality of generally axially directed radially extending front and rear recesses defined generally by said ribs, arcuate connecting portions, tapered connecting portions and webs, each of said front recesses being so formed as to have a generally radial plane passing through the middle thereof form a slight angle with respect to a plane containing the axis of said wheel, each of said rear recesses being so formed as to have a generally radial plane passing through the middle thereof form a large angle with respect to said plane containing the axis of said wheel which is substantially greater than said slight angle formed by said front recesses, means provided along each of said webs and between said blades for creating areas of localized stress concentrations therealong, apertures formed through each of said webs so as to intersect said means and respectively interconnect said front and rear recesses, and a rivet received through each of said apertures in a manner causing the head end of the rivet to be disposed generally within said front recess and the end of said rivet opposite to said head and disposed in said rear recess, said opposite end of said rivet being upset in order to prevent withdrawal of said rivet from said aperture.

3. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, and means for preventing the radially inward propagation of said cracks beyond a predetermined point, said means comprising a generally axially directed aperture formed through each of said area of stress concentration and circumferentially spaced about said body section so as to be between said ribs.

4. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, an aperture formed through each of said areas of stress concentration for limiting the length of said cracks, and sealing means mechanically retained within each of said apertures forming a substantial barrier to the free passage of gases therethrough.

5. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, an aperture formed through each of said areas of stress concentration for limiting the length of said cracks, sealing means mechanically retained within each of said apertures forming a substantial barrier to the free passage of gases therethrough, and a filler material deposited generally between said sealing means and said walls in the vicinity of said apertures for substantially preventing the occurrence of leak passages about said sealing means.

6. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, an aperture formed through each of said selected walls for limiting the length of said cracks, and sealing means mechanically retained within each of said apertures forming a substantial barrier to the free passage of gases therethrough, said sealing means comprising a rivet received through each of said apertures in a manner causing the head end of the rivet to be disposed on one side of said walls and the end of said rivet opposite to said head end being disposed on the side of said wall opposite to said one side and upset so as to prevent withdrawal of said rivet from said aperture.

7. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, an aperture formed through at least each of said selected walls for limiting the length of said cracks, a rivet received through each of said apertures, and a layer of filler material bonded to at least a portion of said selected wall and generally enclosing said rivet in order to at least substantially eliminate the existence of a leak passage for gases around said rivet.

8. A turbine wheel comprising a disc-like body and a plurality of circumferentially spaced radially directed turbine blades, a circumferentially continuous annular pedestal portion formed integrally with and carried by said body and in turn peripherally carrying said tubrine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, an aperture formed through at least each of said selected walls for limiting the length of said cracks, and means for closing each of said apertures for preventing the free passage therethrough of gases.

9. A turbine wheel comprising a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, an aperture formed through at least each of said selected walls for limiting the length of said cracks, and means for closing each of said apertures for preventing the free passage therethrough of gases, said means comprising filler material bonded to said wall generally peripherally about said aperture.

References Cited by the Examiner

UNITED STATES PATENTS

| 2,380,276 | 7/1945 | Warren | 253—77 |
| 2,460,893 | 2/1949 | MacClutcheon | 253—77 |
| 2,472,886 | 6/1949 | Conrad et al. | 253—77 |
| 2,660,400 | 11/1953 | Griffith | 253—77 |
| 2,772,854 | 12/1956 | Anxionnaz | 253—77 |
| 2,888,239 | 5/1959 | Slemmons | 253—39 |
| 2,922,619 | 1/1960 | Slemmons | 253—77 |
| 3,104,093 | 9/1963 | Craig | 253—77 |

FOREIGN PATENTS

| 624,166 | 7/1961 | Canada. |
| 1,256,467 | 2/1961 | France. |
| 652,099 | 4/1951 | Great Britain. |
| 708,836 | 5/1954 | Great Britain. |

MARTIN P. SCHWADRON, *Primary Examiner.*

E. A. POWELL, JR., *Assistant Examiner.*